US007870267B2

(12) United States Patent
Gilfix et al.

(10) Patent No.: US 7,870,267 B2
(45) Date of Patent: Jan. 11, 2011

(54) CREATING GLOBAL SESSIONS ACROSS CONVERGED PROTOCOL APPLICATIONS

(75) Inventors: Michael A. Gilfix, Austin, TX (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 11/749,484

(22) Filed: May 16, 2007

(65) Prior Publication Data
US 2008/0288644 A1 Nov. 20, 2008

(51) Int. Cl.
*G06F 15/16* (2006.01)
(52) U.S. Cl. .................. 709/227; 709/228; 709/249
(58) Field of Classification Search ............... None
See application file for complete search history.

(56) References Cited

U.S. PATENT DOCUMENTS

| | | | | | |
|---|---|---|---|---|---|
| 4,851,988 | A | * | 7/1989 | Trottier et al. ............... | 709/226 |
| 5,577,209 | A | * | 11/1996 | Boyle et al. ................. | 709/227 |
| 5,765,200 | A | * | 6/1998 | McIlvain et al. ............ | 711/170 |
| 6,192,514 | B1 | * | 2/2001 | Lurndal ....................... | 717/149 |
| 6,308,212 | B1 | * | 10/2001 | Besaw et al. ................ | 709/228 |
| 6,567,852 | B2 | * | 5/2003 | Besaw et al. ................ | 709/228 |
| 7,414,975 | B2 | * | 8/2008 | Olderdissen ................ | 370/236 |
| 7,596,804 | B2 | * | 9/2009 | Toomey et al. .............. | 709/213 |

OTHER PUBLICATIONS

Kaminsky, Michael et al. "Decentralized User Authentication in a Global File System." Proceedings of the 19th ACM Symposium on Operating Systems Principles. ACM Press. Dec. 2003. pp. 60-73.*

* cited by examiner

*Primary Examiner*—Vivek Srivastava
*Assistant Examiner*—Jeffrey R Swearingen
(74) *Attorney, Agent, or Firm*—Stephen J. Walder, Jr.; David A. Mims, Jr.

(57) ABSTRACT

Mechanisms for creating global sessions across different protocols and multiple converged protocol applications are provided. By creating a global session, state information for each of the individual protocol sessions may be communicated across protocols and utilized in performing operations across converged protocol applications. An edge server is used at the edge of a data network to correlate client interactions over different protocols and to associate them with a global session. The edge server acts as a session reference counter for individual client sessions that are part of a larger global session. The global session is created after the creation of the first protocol session and exists across the creation of future sessions on other protocols and other converged applications. Logical names and global session tokens are utilized to manage the various global sessions handled by the edge server.

35 Claims, 5 Drawing Sheets

CREATING GLOBAL SESSIONS ACROSS CONVERGED PROTOCOL APPLICATIONS

BACKGROUND

1. Technical Field

The present application relates generally to an improved data processing system and method. More specifically, the present application is directed to a system and method for creating global sessions across converged protocol applications.

2. Description of Related Art

A converged protocol application is an application or service that spans multiple protocols and interacts with different data network entities using different communication protocols. Such converged applications are increasingly being utilized in today's data network environment in which services of various types utilize a plurality of different protocols are used to perform various interactions between data network entities.

For example, HyperText Transfer Protocol (HTTP) is used to transfer data across the World Wide Web, Session Initiation Protocol (SIP) is used to initialize multimedia sessions across data networks, Post Office Protocol 3 (POP3) is used by client machines to access electronic mail data on remote electronic mail servers, etc. Two or more of these protocols may be used together in a converged application to achieve a desired functionality. Because applications today integrate many different services into a single application or set of applications, converged applications are becoming more prevalent.

WebSphere Application Server™, a software application server available from International Business Machines Corporation of Armonk, N.Y., provides a programmatic API and infrastructure, based on the JSR116 Java standard, to allow developers to create converged applications. There are two ways to use this API to create converged applications: 1) either one protocol (typically HTTP) is used as a control protocol while the application communicates over the other protocol out of the back-end, or 2) protocol sessions must be joined together by encoding the reference used to communicate with the service, e.g., a Uniform Resource Locator (URL) with an identifier that correlates the sessions.

The second approach is particularly important to support distributed deployments, where a technique referred to as "session affinity" is used to route requests to application server instances that house the active sessions. All protocol sessions that participate in a converged session must live in the same application server instance. In order to enable appropriate routing of a converged application request, the encoded identifier must be present, i.e. hard coded into the URL, to enable the load balancing infrastructure to perform correct routing. The disadvantage of this approach is that the client requester must explicitly encode the request identifier in order to join together two sessions and client application logic must be explicitly programmed to support this behavior. Moreover, there is currently no known mechanism for associating multiple converged application sessions into a single global session.

SUMMARY

The illustrative embodiments provide a system and method for creating global sessions across converged protocol applications, as well as for joining together two protocol sessions without requiring explicit work on the part of the requester. A global session allows the application to store higher level state information about the operation of the application across multiple protocol sessions or converged protocol sessions.

The term "global session" as it is used herein means a session comprising state information from multiple protocol sessions and/or converged protocol sessions, the state information being automatically associated with one another by way of a common identifier, such as a logical name, assigned to the global session. The use of a "global session", as provided by the mechanisms of the illustrative embodiments, permits the generation of "composite converged applications," which are applications whose function is derived from multiple converged protocol applications.

With the mechanisms of the illustrative embodiments, an edge server or proxy is used at the edge of a data network to correlate client interactions over different protocols and to associate them with a global session. In one illustrative embodiment, the edge server or proxy may be a WebSphere™ edge server available from International Business Machines Corporation of Armonk, N.Y., which provides an edge proxy device for internal network components within the WebSphere™ internal network, e.g., application servers and the like. In another embodiment, the edge server or proxy may be a WebSphere proxy server provided as part of the WebSphere™ Application Server network deployment runtime. The edge server or proxy acts as a session reference counter for individual client sessions that are part of a larger global session. The global session is created after the creation of the first protocol session flowing through the edge server or proxy and exists across the creation of future sessions on other protocols flowing through the edge server or proxy. The global session is destroyed when sessions across all protocols are depleted.

In order to distinguish between sessions that are part of a global session from sessions that are not part of the global session, the converged protocol application communications are associated with a logical name that is used in conjunction with reference counting. The logical name may be, for example, a DNS virtual host name or IP address associated with the edge server, a communication Uniform Resource Identifier (URI), or the like. Client devices may interact with the edge server to initiate converged communications either via direct configuration or via redirection within a particular protocol.

With the mechanisms of the illustrative embodiments, once a global session has been created, the edge server inserts a unique token in the protocol message/stream that can be recognized by other internal network components, e.g., WebSphere™ components such as application servers and the like. In a preferred embodiment, this unique token only exists within the internal network. However, in an alternative embodiment, the unique token may be passed to external network elements as well in order to facilitate a global session between two different internal networks.

In the case of a token that exists only within the internal network, as soon as a message containing such a token passes to an external element through the edge server or proxy, the token is removed. Thus, the reference counting capability associated with the logical name of the edge server or proxy becomes the means for mapping sessions to a global session token used in the internal network. This global session token may then be passed between application servers who can use the global session token to retrieve global session information, or data, along with the session information specific to the protocol interaction with which the message belongs. State information associated with global sessions may then be passed to the application as part of the application server managed state information typically passed to application code, e.g., servlet session and context information.

Depending upon the particular implementation, each application server of the internal network, or logical groups of clusters, may maintain its own global session information. Conceptually, session information across the different protocols can be thought of as living within the global session context, although correlation of global information and individual session information is sufficient in practice.

The global session token then serves as a mechanism for binding all of this global session information together across the different entities within the internal network infrastructure. In another illustrative embodiment, global session information may be distributed to the various participating entities by the edge server to synchronize session information.

In one illustrative embodiment, a method for correlating communications of multiple protocol sessions into a single global session is provided. The method may comprise receiving, from an external device of an external data network, a session request message using a first communication protocol and generating a global session in response to receiving the session request message, the global session having a unique logical name and a unique global token associated with the global session. The method may further comprise correlating communications with the external device as part of the global session based on the unique logical name of the global session and correlating communications with internal devices of an internal data network of the data processing system as part of the global session based on the unique global token of the global session. At least one of the communications with the external device or the communications with the internal devices may be communications using different communication protocols.

The method may further comprise sharing state information between a first application running on the external device and at least one second application running on at least one internal device using the unique logical name and the unique global token of the global session. The unique global token may be associated with the unique logical name such that state information of the at least one second application may be accessible by the first application.

The method may further comprise sharing state information between applications running on internal devices of the internal data network using the global session token. Correlating communications with internal devices as part of the global session based on the unique global token of the global session may comprise correlating communications of multiple converged protocol applications running on the internal devices by exchanging the global token of the global session as part of the communications.

The method may further comprise determining whether the session request message is an initial session request message and generating a local session in response to determining that the session request message is an initial session request message. Moreover, the method may comprise determining whether a global session exists for the session request message. Generating the global session may be performed only if a global session does not already exist for the session request message.

The method may also comprise incrementing a global session count associated with the global session in response to determining that the global session exists for the session request message and the session request message is an initial session request message. Moreover, the method may comprise inserting the global token associated with the global session into the session request message and forwarding the session request message to at least one internal device of the internal data network. The method may further comprise decrementing the global session count associated with the global session in response to tearing down of a local session associated with the global session and reclaiming resources of the global session in response to the global session count becoming zero by way of the decrementing.

The method of the illustrative embodiment may further comprise receiving a message from the external device, the message being communicated to the data processing system using a logical name of a global session, and identifying the global session associated with the message based on the logical name. The method may also comprise identifying a global session global token associated with the identified global session, inserting the global session global token into the received message to generate a modified message, and sending the modified message to at least one internal device of the internal data network.

The method according to the illustrative embodiment may further comprise receiving a message from an internal device, the message including the global token of the global session. Furthermore, the method may comprise removing the global token from the received message to generate a modified message and sending the modified message to the external device.

The unique logical name may be one of a Directory Name Service (DNS) hostname, a virtual host name, an address, or a Uniform Resource Identifier (URI). The global session may be one of a plurality of global sessions in the data processing system. Each global session in the plurality of global sessions may have a different unique logical name and a different unique global token.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a data processing system is provided. The data processing system may comprise a proxy device and at least one internal data processing device coupled to the proxy device via an internal data network. The proxy device may receive, from an external device of an external data network, a session request message using a first communication protocol and may generate a global session in response to receiving the session request message, the global session having a unique logical name and a unique global token associated with the global session. Communications with the external device may be correlated with the global session based on the unique logical name of the global session. Communications with the at least one internal data processing device may be correlated with the global session based on the unique global token of the global session. At least one of the communications with the external device or the communications with the at least one internal data processing device may be communications using different communication protocols.

State information may be shared between a first application running on the external device and at least one second application running on the at least one internal data processing device using the unique logical name and the unique global token of the global session. The unique global token may be associated with the unique logical name such that state information of the at least one second application may be accessible by the first application.

State information may be shared between applications running on the at least one internal data processing device using the global session token. Communications with the at least one internal data processing device may be correlated with the global session based on the unique global token of the global session by correlating communications of multiple converged protocol applications running on the at least one internal data processing device by exchanging the global token of the global session as part of the communications.

The proxy device may further determine whether the session request message is an initial session request message and generate a local session in response to determining that the session request message is an initial session request message. The proxy device may also determine whether a global session exists for the session request message. The proxy device may generate the global session only if a global session does not already exist for the session request message.

The proxy device may further increment a global session count associated with the global session in response to determining that the global session exists for the session request message and the session request message is an initial session request message. The proxy device may also insert the global token associated with the global session into the session request message and forward the session request message to at least one internal device of the internal data network. The proxy device may decrement the global session count associated with the global session in response to tearing down of a local session associated with the global session and reclaim resources of the global session in response to the global session count becoming zero by way of the decrementing.

The proxy device may further receive a message from the external device, the message being communicated to the data processing system using a logical name of a global session. The proxy device may also identify the global session associated with the message based on the logical name and identify a global session global token associated with the identified global session. The proxy device may insert the global session global token into the received message to generate a modified message and send the modified message to at least one internal device of the internal data network.

Moreover, the proxy device may receive a message from an internal device, the message including the global token of the global session. The proxy device may remove the global token from the received message to generate a modified message and send the modified message to the external device.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
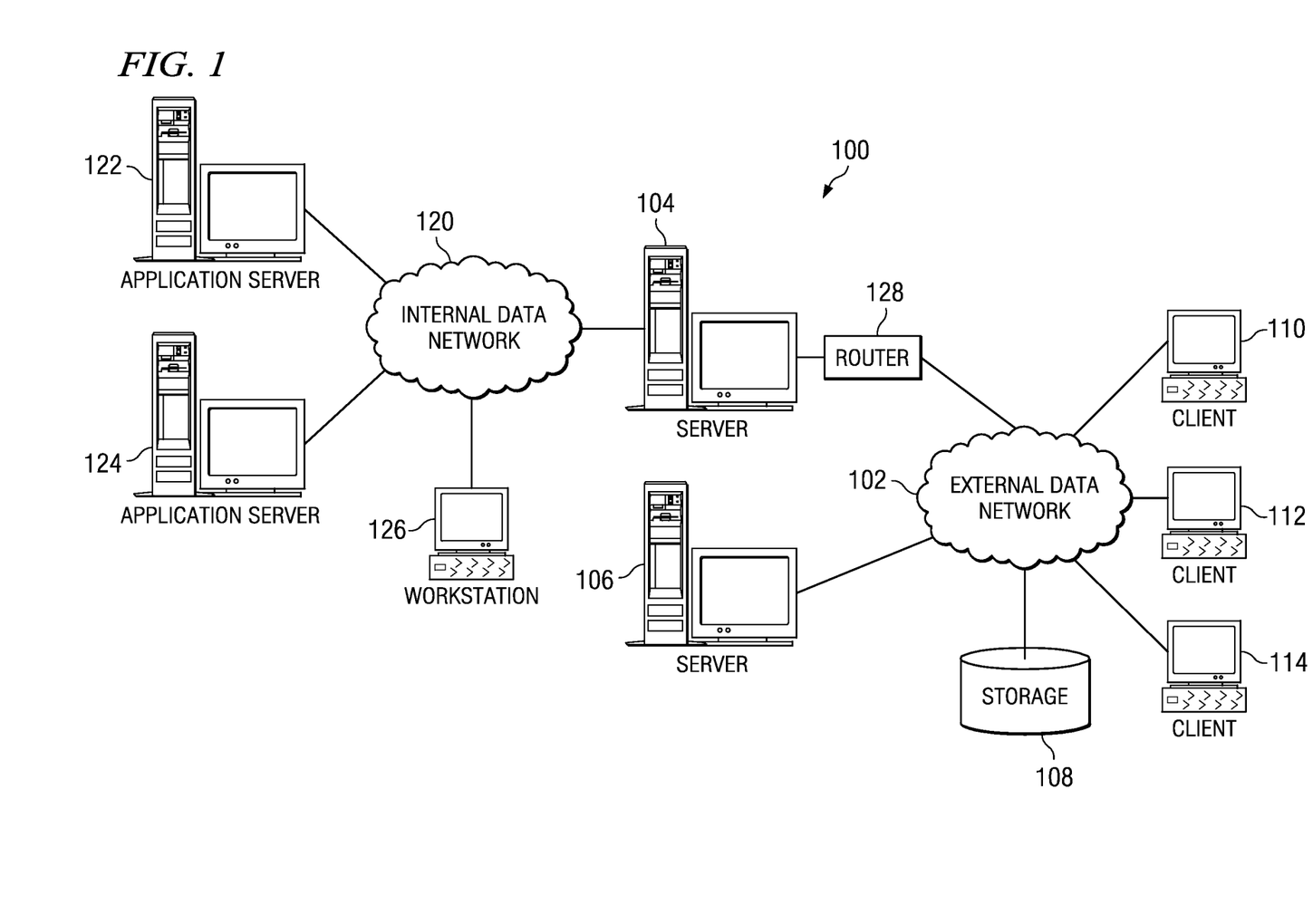
FIG. 1 is an exemplary diagram depicting a pictorial representation of an exemplary distributed data processing system in which aspects of the illustrative embodiments may be implemented.
Figure 2:
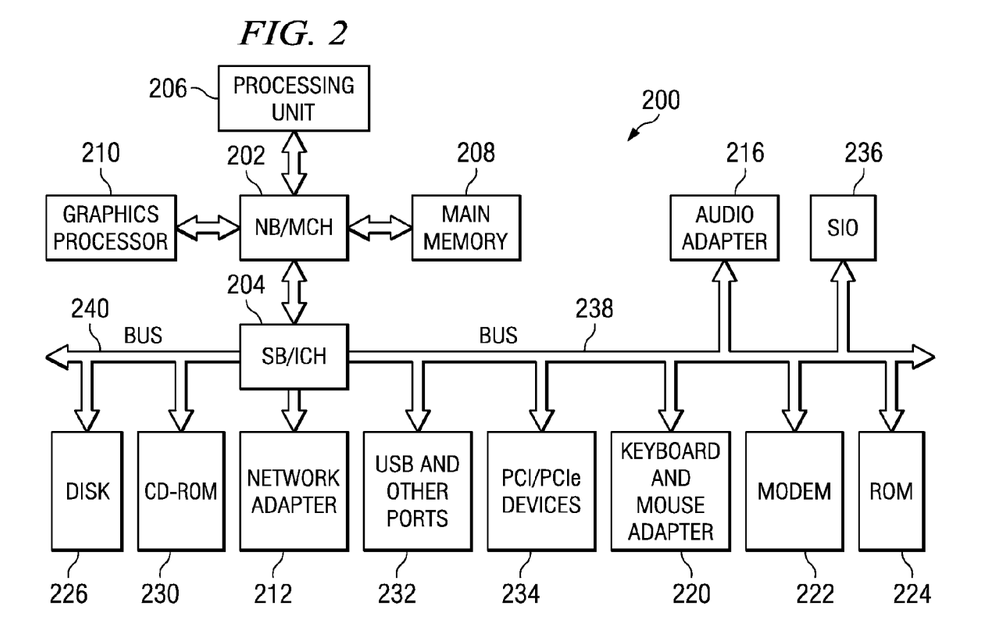
FIG. 2 is a block diagram of an exemplary data processing system in which aspects of the illustrative embodiments may be implemented.

The illustrative embodiments are directed to a system and method for creating global sessions across converged protocol applications. As such, the illustrative embodiments are especially well suited for application to distributed data processing environments in which communication between a plurality of data processing devices is facilitated by one or more data networks. In order to provide a context in which to understand the primary operational components of the illustrative embodiments, FIGS. 1-2 are provided hereafter as examples of a distributed data processing environment and a data processing device in which aspects of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one external data network 102, which is the medium used to provide communication links between various devices and computers connected together within distributed data processing system 100. The external data network 102 may include connections, such as wire, wireless communication links, or fiber optic cables.

In the depicted example, server 104 and server 106 are connected to external data network 102 along with storage unit 108. In addition, clients 110, 112, and 114 are also connected to external data network 102. These clients 110, 112, and 114 may be, for example, personal computers, network computers, or the like. In the depicted example, servers 104 and 106 may provide data, such as boot files, operating system images, and applications to the clients 110, 112, and 114. Clients 110, 112, and 114 are clients to servers 104 and 106 in the depicted example.

Moreover, as shown in FIG. 1, server 104 may provide an access gateway to an internal data network 120. The internal data network 120 may provide a data communication medium for accessing applications provided by application servers 122-124 as well as for communication with workstation 126. Client devices 110-114 may access applications and data provided by the application servers 122-124 of the internal data network 120 via their external data network 102 and server 104. It should be appreciated that the distributed data processing system 100 may include additional servers, clients, and other devices not shown in FIG. 1 without departing from the spirit and scope of the present invention.

In the depicted example, external data network 102 may represent the Internet, i.e. a worldwide collection of networks and gateways that use the Transmission Control Protocol/

Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a system and method for creating global sessions across various protocol sessions and/or across a plurality of converged protocol applications. The mechanisms of the illustrative embodiments may be implemented in data processing devices, such as the one shown in FIG. 2, which may be provided as edge servers or proxy devices between an Information Technology (IT) organization's internal data network, or intranet, and an external data network, such as the Internet. The internal data network may be comprised of one or more internal network elements that provide services or functionality to client data processing devices of the external data network. The term "internal data network", e.g., an intranet, refers to a set of one or more data processing devices that communicate with a wide area network via one or more boundary devices, e.g., routers or the like, and which is conceptually separate from the wide area network via various security mechanisms, e.g., firewalls and the like. The term "external data network" refers to one or more data processing devices and data networks that are external to the internal data network and communicate through a gateway router at the boundary of the internal network. Communications to/from the external data network may pass through one or more edge servers or proxy devices.

In FIG. 1, for example, the internal data network 120 may be accessible by client devices 110-114 and server 106 of the external data network 102 via one or more boundary routers 128 and an edge server or proxy device 104. The boundary routers 128 may be part of the internal data network 120 and may provide a firewall for protecting the internal data network 120 from unauthorized access by data processing devices coupled to the external data network 102. The internal data network 120 may be coupled to the edge server/proxy device 104 such that the internal data network 120 is only accessible by external devices 106 and 110-114 via the external data network 102, the boundary router 128, and the edge server/proxy device 104. The external devices 106 and 110-114 may communicate with the edge server/proxy device 104 via the external data network 102 to obtain access to services and functionality provided by one or more application servers 122-124 of the internal data network 120, for example. In one illustrative embodiment, the internal data network 120 may utilize the WebSphere™ Application Server environment, which is a software suite for delivering business integratation, application and transaction infrastructure, and other functionality for electronic businesses, and which is available from International Business Machines Corporation of Armonk, N.Y.

With the mechanisms of the illustrative embodiments, the edge server/proxy device 104 is used at the edge of the internal data network 120 to correlate client device, e.g., client device 110, interactions over different protocols and different converged application sessions in order to associate them with a global session. For example, the external data network 102 may utilize HyperText Transfer Protocol (HTTP) and other protocols for performing various operations including communication, database access, accounting operations, electronic mail operations, etc., while the internal data network 120 may utilize Session Initiation Protocol (SIP) and other protocols to perform its various operations. A converged protocol application makes use of various functionalities performed using various different protocols to achieve an overall purpose. The edge server/proxy device 104 of the illustrative embodiments provides a mechanism for placing all of the sessions created for the various protocols, and for the various converged application sessions for converged applications running on the application servers 122-124 of the internal data network 120, under a single umbrella such that state information specific to each of the protocols may be combined into a global session data structure (in the case of a single converged session), or multiple global session data structures may be linked by the edge server/proxy device 104 (in the case of multiple converged sessions). In this way, the global session state information may be shared between protocols and converged applications. Furthermore, the use of a "global session", as provided by the mechanisms of the illustrative embodiments, permits the generation of "composite converged applications," which are applications whose function is derived from multiple converged protocol applications.

In one illustrative embodiment, the edge server/proxy device 104 is a WebSphere™ edge server available from International Business Machines Corporation of Armonk, N.Y. The edge server/proxy device 104 has four basic components: a network dispatcher, a caching proxy system, a content distribution engine, and an application service engine. The network dispatcher is used to direct incoming requests to an appropriate server, e.g., application server 122 or 124, based on a set of rules which may include load balancing requests across several servers and content based routing, i.e. redirecting a request based on the content of that request. The caching proxy system may be used as either a forward or reverse-proxy server. Requested content may be cached by the edge server/proxy device 104 before being sent to the requester. The caching proxy system is able to cache dynamically generated page fragments from JavaServer pages and servlets. The content distribution engine may be used to synchronize static Web content across a number of Web servers when content is published. The application service engine provides an ability to build a dynamic web page from fragments generated by multiple application servers.

In addition to these four basic components, the edge server/proxy device 104 of the illustrative embodiments includes a global session management engine and associated global session data structure, which may be maintained in the edge server/proxy device 104 itself or in an associated storage device (not shown). The edge server/proxy device 104 acts as a session reference counter for individual client sessions that are part of a larger global session. The global session is created after the creation of the first protocol session and exists across the creation of future sessions on other protocols. The global session is destroyed, via any known or later developed garbage collection mechanism, when sessions across all protocols are depleted.

In order to distinguish sessions that are part of a global session from other sessions that are not part of the global session, the converged protocol application communications are associated with a logical name that is used in conjunction with reference counting. The logical name may be, for example, a Directory Name Server (DNS) virtual host name or IP address associated with the edge server/proxy device 104, a communication Uniform Resource Identifier (URI), or the like. Client devices may interact with the edge server/proxy device 104 to initiate converged communications either via direct configuration or via redirection within a particular protocol.

With the mechanisms of the illustrative embodiments, once a global session has been created, the edge server/proxy device 104 inserts a unique token in the protocol message/stream that can be recognized by other internal network components, e.g., WebSphere components such as application servers and the like. In a preferred embodiment, this unique token only exists within the internal data network 120. However, in an alternative embodiment, the unique token may be passed to external network elements as well, in order to facilitate a global session between two different internal data networks, for example.

In the case of a token that exists only within the internal data network 120, as soon as a message containing such a token passes through the edge server/proxy device 104 destined for an external device 106 or 110-114 of the external data network 102, the token is removed by the edge server/proxy device 104. Thus, the reference counting capability associated with the logical name of the edge server/proxy device 104 becomes the means for mapping sessions in the external data network 102 to a global session token used in the internal data network 120. The edge server/proxy device 104 may maintain one or more data structures for correlating logical names of the edge server/proxy device 104 with global session tokens used by the internal data network 120.

The global session token may then be passed between application servers, e.g., application servers 122-124, which can use the global session token to retrieve global session information along with the session information specific to the protocol interaction with which the message belongs. State information associated with global sessions may then be passed to the application of the application servers 122-124 as part of the application server managed state information, e.g., servlet session and context information, typically passed to application code.

Depending upon the particular implementation, each application server 122-124 of the internal data network 120, or logical groups of server clusters, may maintain their own global session information. The global session token may then serve as a mechanism for binding all of this global session information together across the different entities within the internal data network 120 infrastructure. In another illustrative embodiment, global session information may be distributed to the various participating entities by the edge server/proxy device 104 to synchronize session information.

Figure 3:
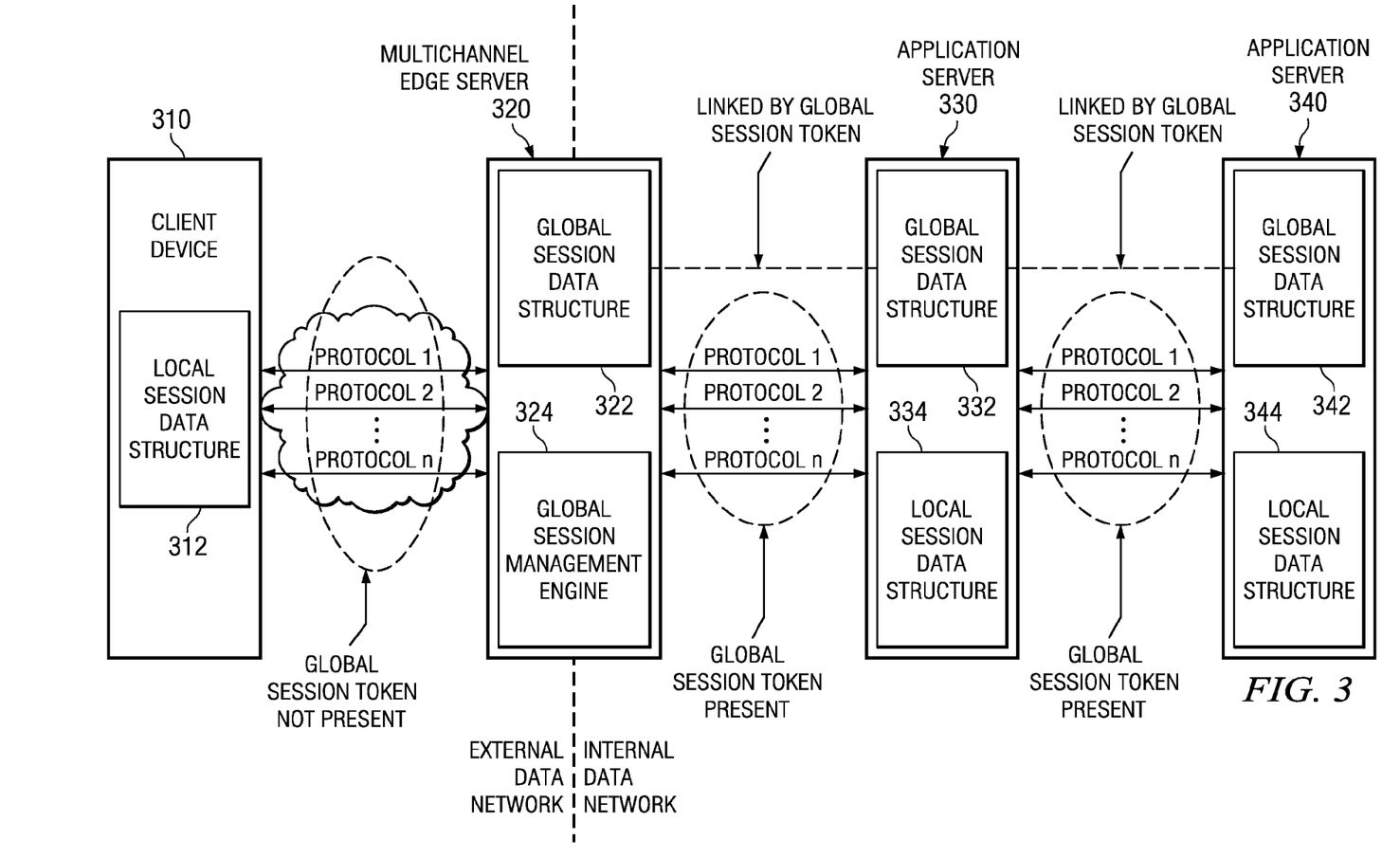
FIG. 3 is an exemplary block diagram illustrating an interaction of primary operational components in accordance with one illustrative embodiment.

FIG. 3 is an exemplary block diagram illustrating an interaction of primary operational components in accordance with one illustrative embodiment. As shown in FIG. 3, a multichannel edge server 320, which acts as a proxy for the application servers 330 and 340 of the internal data network, is provided on an edge between the external data network and the internal data network (other edge elements, such as routers and the like, are not shown in FIG. 3 for clarity purposes). Multiple channels may be established between the external client devices, e.g., client device 310, and the multichannel edge server 320 as well as between internal data network elements, such as application servers 330 and 340, and the multichannel edge server 320. Each of these channels may utilize a different protocol for communication. For example, one channel may utilize SIP, another channel may utilize HTTP, or the like.

When a client device 310 wishes to initiate communication with an application provided by one or more of application servers 330 and 340, the client device 310 may send a session request message in the desired protocol across a channel to the multichannel edge server 320. For example, when a service is deployed, a logical name is assigned to the service, such as in a Domain Name Service (DNS) directory. When a user of a client device wishes to use the service, the user of the client device enters the logical name in the browser and the client device performs a lookup operation in the DNS directory based on the logical name to identify a network address, e.g., IP address. The IP address points the client device to IP spraying and routing network elements in the external network. These elements direct the session request from the client device through the multichannel edge server 320, which serves as a proxy for the global converged services.

The multichannel edge server 320 assigns a logical name, e.g., a DNS hostname, virtual host name, IP address, URI, or the like, and global session token, to a global session created in response to the session request. The logical name is returned to the client device 310 which associates the same logical name with all communications that are part of the same global session. For example, all communications with host "converged.foo.com" are part of the same global session and thus, the same reference counting performed by the multichannel edge server 320. Hence, for all communications that are part of the same converged application, the client device 310 sets the outgoing proxy for each protocol to be the multichannel edge server 320.

It should be appreciated that the multichannel edge server 320 may have different logical names, for example, virtual host names, that it uses to semantically separate global sessions. Thus, each logical name may correspond to a global session and hence, a set of one or more converged applications.

As mentioned above, in addition to assigning a logical name for the global session that is used by the external client device 310, the multichannel edge server 320 further inserts a global session token that is used by the internal data network elements to correlate global session information across the various protocols and internal data network elements utilized. This global session token is unique to each global session and thus, serves to separate global session information within the internal data network as well as correlate this global session information with the logical name used by external data network elements.

The assigning and managing of the global session tokens may be performed, for example, by the global session management engine 324 of the multichannel edge server 320. The global session management engine 324 may maintain one or more global session data structure 322, either in the multichannel edge server 320 or in a storage device (not shown) associated with or otherwise accessible by the multichannel edge server 320. The global session data structure 322 may correlate the global session token with the logical name utilized by the external client device 310 and may be utilized by the global session management engine 324 to add the global session token to messages passing from the external data network to the internal data network. Moreover, the global session data structure 322 may store other global session information, such as servlet session and context information, for use in correlating global session information across the various internal network elements, e.g., application servers 330 and 340. Such other global session information may be provided to the multichannel edge server 320, for example, by the internal data network elements, e.g., application servers 330 and 340.

The client device 310 and application servers 330 and 340 may each store local session data structure 312 for maintaining session state information for each local session in each protocol utilized by the converged applications. This local session state information may be processed in conjunction with the global session state information in the global session data structure 322. That is, state data may be stored in the global session data structure in order to communicate between multiple converged protocol sessions. Moreover, each individual application server 330, 340 in the internal data network may maintain its own global session data structure 332, 342 which is individually updated by the corresponding application server 330, 340. Each application server 330, 340 may access the global session data structure 322, 332, 342 of the multichannel edge server 320 or the other application servers using the global session token to thereby retrieve global state information required by the application(s) running on that application server 330, 340.

Thus, the global session data structures 332, 342 may be linked with each other by way of the global session token assigned to the global session. A synchronization operation may be periodically performed, such as via an out-of-band operation, to synchronize the global session data structures 322, 332, and 342 to ensure that each element of the internal data network has the most up-to-date global session information. Various mechanisms may be utilized to perform such synchronization operations which are generally known in the art.

Thus, with the illustrative embodiments, regardless of which channel and which protocol is currently being utilized, the global session token for a global session established between one or more client devices 310, and one or more application servers 330 and 340 of the internal data network, is inserted into the messages sent between the multichannel edge server 320 and the internal data network elements. Thus, for the same global session, the same global session token may be inserted into HTTP messages, SIP messages, and the like, that pass between the multichannel edge server 320 and the internal data network elements, e.g., application servers 330 and 340. Moreover, the global session token is further utilized in messages passed between internal data network elements, e.g., between application server 330 and application server 340. The global session token may be inserted, for example, into header information of messages passed between internal data network elements.

At the application servers 330 and 340, when the application server 330 or 340 receives a message, the application server 330 or 340 parses the message to extract the global session token, if any. Having determined that the global session token is not present, the application server determines if this is an initial protocol session request and there is no existing global session data structure, e.g., a global session object. If this is the case, the application server 330 or 340 generates both a local session data structure and a global session data structure, e.g., a local session object and a global session object. The application server 330 or 340 may then communicate global session information, which is maintained in the global session data structures 332 and 342, back to the multichannel edge server 320.

If this is an initial protocol session request and there is an existing global session object, i.e. a global session token is present in the message, then the application server just creates the local session data structure but populates both the local session data structure and global session data structure with session information, e.g., servlet and context information. If the request is a request for an existing protocol session and global session, the local and global session data structures are populated with the session information, e.g., servlet and context information. This session information may be generated by the reentrant code of one or more servlets. With a simple session, typically a servlet container receives a request, determines which local session it corresponds to, finds a thread on which to execute the reentrant servlet code, and sets up the context information and session information in the thread. Typically session information is stored in an object that has attribute-value pairs. The servlet code stores state information in those attribute-value pairs and retrieves them during execution.

In one illustrative embodiment, the global session management engine 324 of the multichannel edge server 320, in addition to inserting the global session token into messages passing into the internal data network, strips the global session tokens from messages passing to the external data network. Thus, messages routed through the external data network do not have the global session token present in them while messages routed through the internal data network do have the global session token present. Within the external data network, the logical name assigned to the global session is utilized to communicate with the multichannel edge server 320 and thus, the global session identifier is not utilized.

The global session management engine 324 further includes a resource counting functionality that facilitates the generation of global session tokens and the tearing down of the global session. Essentially, the global session management engine 324, upon receiving a session request, determines if this is an initial session request. If the request is not an initial session request, then the global session token for the corresponding global session is inserted into the request message and the message is forwarded on to the internal data network.

If the request is an initial session request, then the global session management engine 324 determines if the global session count for the global session is zero or not. If the global session is just now being created, i.e. there is no existing global session for this request, then the global session count will be zero. As a result, a new global session token is generated and the global session count is incremented. The newly generated global session token may then be used with messages passed to the internal data network as part of this global session. If the global session count for the global session is not zero, i.e. the request is associated with an existing global session, then the global session count is incremented, the global session token is inserted into the message, and the message is forwarded on to the internal data network.

As sessions are torn down in the internal data network, the global session count is decremented by the global session management engine 324. The multichannel edge server 320 may be informed of the tearing down of the sessions in various ways depending upon the protocol used. For example, with HTTP, there may be an expiration associated with a cookie, which represents the session, that must be renewed. With SIP, there may be explicit protocol messages that tear down the session. Other protocols may use other mechanisms for informing the multichannel edge server 320 of the tearing down of sessions. When the global session count again reaches a zero value, all sessions associated with the global session have been torn down and thus, the global session may be eliminated and resources reclaimed, such as via any known or later developed garbage collection mechanism, for example.

Thus, the mechanisms of the illustrative embodiments permit the generation of a global session that encompasses the local sessions within an internal data network and existing between one or more external client devices and the internal data network. Moreover, the global session may encompass local sessions of a plurality of different converged applications executing in the internal data network or across a plurality of internal data networks. The global session traverses all protocols utilized by any converged applications.

The logical name and global session token mechanisms permit the correlation of state information across protocols, local sessions, and converged application sessions. That is, requests within the internal data network may reference the global session token in order to access any global session state information on any of the internal data network elements, thereby linking the global session state information across internal data network elements. Moreover, external data processing devices may associate their requests and other communications with the global session using the logical name associated with the global session thereby providing access to the global session information as well.

Figure 4:
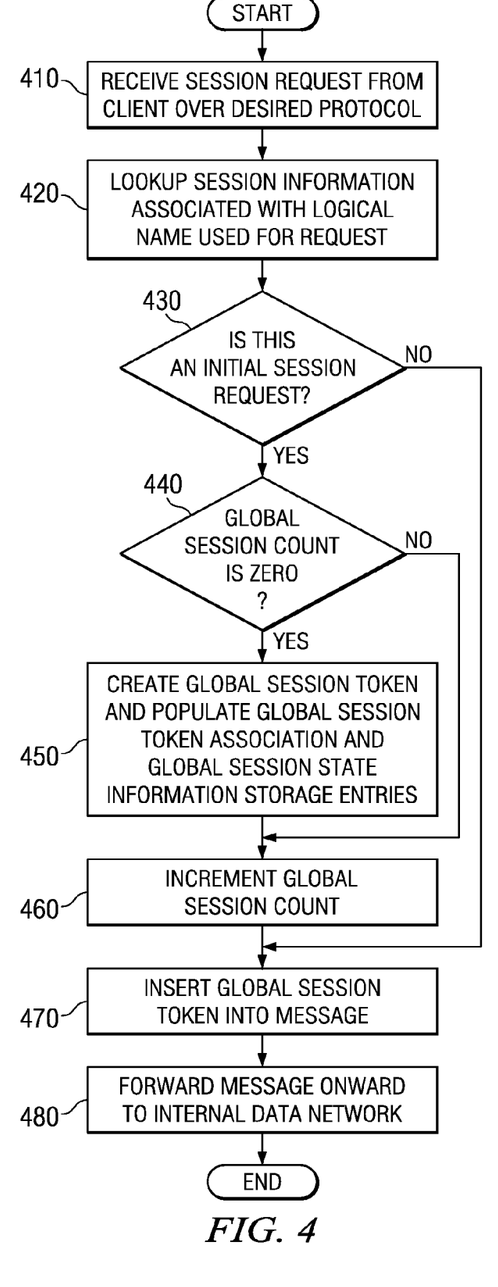
FIG. 4 is a flowchart outlining an exemplary operation for handling external session requests in accordance with one illustrative embodiment.
Figure 5:
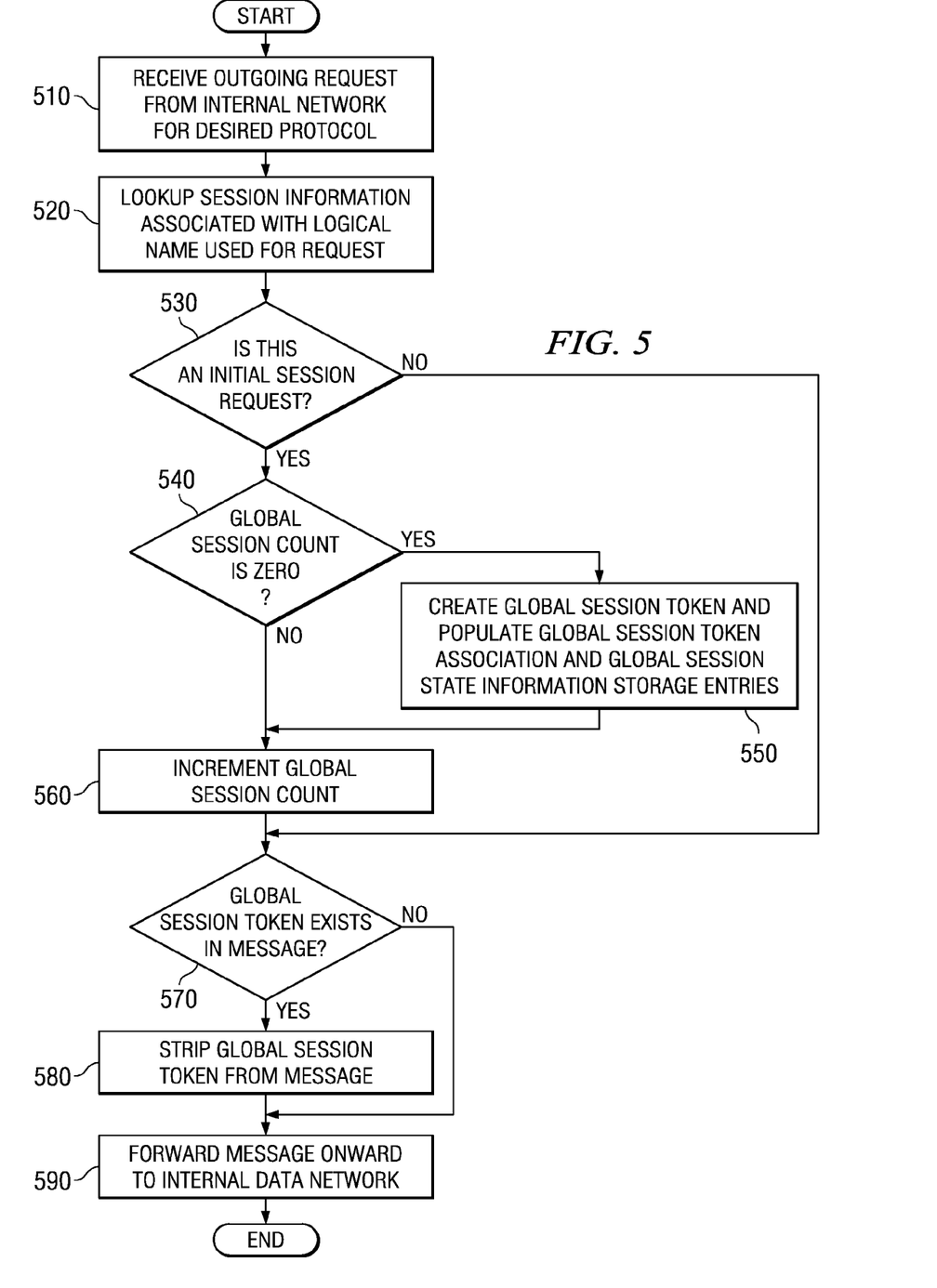
FIG. 5 is a flowchart outlining an exemplary operation for handling an internal network's outgoing requests in accordance with one illustrative embodiment.
Figure 6:
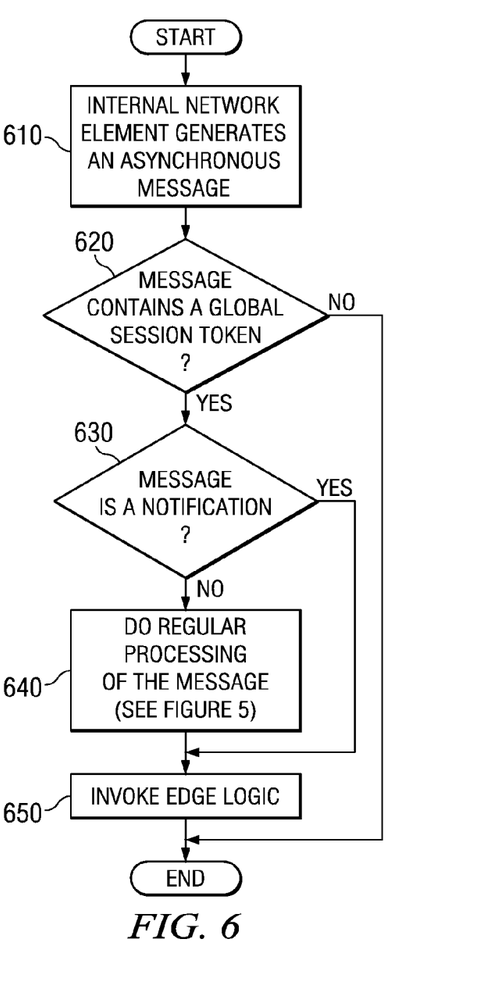
FIG. 6 is a flowchart outlining an exemplary operation for asynchronous messaging by a protocol that does not support asynchronous messaging in accordance with one illustrative embodiment.

FIGS. 4-6 are exemplary flowcharts outlining exemplary operations of an edge server in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 4 is a flowchart outlining an exemplary operation for handling external session requests in accordance with one illustrative embodiment. As shown in FIG. 4, the operation starts with the edge server receiving a session request from a client device over a desired protocol (step 410). The global session information associated with the logical name used for the request is looked up (step 420). This global session information may be generated when a first session is initially created, for example, such as when a cookie is returned in HTTP, an INVITE message is received in SIP, or the like. It should be appreciated that if this is an initial session request that is not associated with any previously generated global session, then this lookup operation will result in no information being returned. If information is returned, then the session request is associated with a previously generated global session.

The edge server determines if the session request is an initial session request or not (step 430). If the session request is an initial session request, the edge server determines if the global session count for the client device is zero (step 440). If the global session count for the client device is zero, a global session token is generated and the global session token association and global session state information entries are populated (step 450). Thereafter, or if the global session count for the client device is not zero, the global session count is incremented for the client device (step 460).

Thereafter, or if the session request is not an initial session request, the global session token is inserted into the session request message (step 470). The modified session request message is then forwarded onward to the internal data network (step 480). The operation then terminates.

FIG. 5 is a flowchart outlining an exemplary operation for handling an internal network's outgoing requests in accordance with one illustrative embodiment. As shown in FIG. 5, the operation starts with the edge server receiving a session request from a client device over a desired protocol (step 510). The global session information associated with the logical name used for the request is looked up (step 520). It should be appreciated that if this is an initial session request that is not associated with any previously generated global session, then this lookup operation will result in no information being returned. If information is returned, then the session request is associated with a previously generated global session.

The edge server determines if the session request is an initial session request or not (step 530). If the session request is an initial session request, the edge server determines if the global session count for the client device is zero (step 540). If the global session count for the client device is zero, a global session token is generated and the global session token association and global session state information entries are populated (step 550). Thereafter, or if the global session count for the client device is not zero, the global session count is incremented for the client device (step 560).

Thereafter, or if the session request is not an initial session request, a determination is made as to whether a global session token exists in the session request message (step 570). If so, the global session token is stripped from the session request message (step 580). Thereafter, or if the session request message does not contain a global session token, the session request message is then forwarded onward to the internal data network (step 590). The operation then terminates.

For protocols that do not support asynchronous messaging or have limited messaging primitives, the client device may require some indication that it needs to participate in a converged application session. An example may include two request-response protocols, e.g., HTTP and some other protocol, in which, after an HTTP request, another application server wishes to initiate some event as part of the converged application session on another channel. In this case, the illustrative embodiments may provide additional edge logic that can be triggered as a result of notification to the client device. Such edge logic may be integrated with the edge server that may then intercept such notifications and coordinate channel communications accordingly.

As an example, a client device may create a SIP multimedia session with a back-end service. As part of the behavior of the back-end service, and with no way of the client device knowing, the back-end service may wish the client device to join into a global converged HTTP/SIP session via HTTP. However, the client device does not know the logical name nor any of the session data that references the global converged application session. Thus, the back-end service sends an outbound notification through the edge server, which executes customized edge logic that communicates with the client device and directs it to initiate an HTTP request through the appropriate logical name.

Thus, the customized edge logic provides a mechanism for signaling to the client device, or client application executing on the client device, that it should join into a global converged session when logic of the application server requires it. This can be employed in asynchronous protocols, such as SIP.

FIG. 6 is a flowchart outlining an exemplary operation for asynchronous messaging by a protocol that does not support asynchronous messaging in accordance with one illustrative embodiment. As shown in FIG. 6, the operation starts with an internal data network element generating an asynchronous message (step 610). The edge server determines if the asynchronous message contains a global session token (step 620). If so, the edge server determines if the message is a notification message (step 630). If not, regular processing of the message, such as described previously with regard to FIG. 5, is performed (step 640). Thereafter, or if the asynchronous message is a notification, the additional edge logic is invoked (step 650). Thereafter, or if the message does not contain a global session token, the operation terminates.

As mentioned above, the additional edge logic is custom logic that intercepts special outbound messages, e.g., a SIP INFO message which is used to convey out-of-band information, and recognizes that code in the application server wants to have the client application join in a global session. This edge logic communicates with the client application via out-of-band mechanisms, e.g., it sends a special message to the client application or intercepts an inbound request and redirects it to a logical name associated with the global session, in order to cause the client application to join the global session.

In an alternative illustrative embodiment, the global session token may not be stripped out of outbound messages by the edge server. In such situations, the outbound messages are destined for other similarly configured internal data networks. In this way, the global session token may used to correlate requests with global session information.

For example, the client device 310 in FIG. 3 may be replaced with a system such as Standard Accounting Program (SAP), Customer Information Control System (CICS), or the like, or even another internal data network similar to that shown in FIG. 3. In such a case, there is no need to strip off the global session token when a request is passed through the edge server. In such cases, the functionality described above with regard to the use of the global session tokens within the internal data networks may be extended to bi-directional communications. In such a bi-direction embodiment, the global session lifetime may exist for a positive session count for all protocol sessions initiated from either direction.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for correlating communications of multiple protocol sessions into a single global session, comprising:
   receiving, from an external device of an external data network, a session request message using a first communication protocol;
   generating a global session in response to receiving the session request message, the global session having a unique logical name and a unique global token associated with the global session;
   correlating communications with the external device as part of the global session based on the unique logical name of the global session; and
   correlating communications with internal devices of an internal data network of the data processing system as part of the global session based on the unique global token of the global session, wherein:
      the global session comprises a least two local sessions with at least one application running on at least one of the internal devices,
      communications with a first application of the one or more applications are performed in a first local session using either the first communication protocol or a second communication protocol different from the first communication protocol,
      the first local session has an associated first local session data structure for maintaining session state information for the first local session,
      communications with a second application of the one or more applications are performed in a second local session using either the second communication protocol or a third communication protocol different from the second communication protocol,
      the second local session has an associated second local session data structure for maintaining session state information for the second local session, and
      session state information in the first local session data structure is correlated with session state information in the second local session data structure using the unique global token.

2. The method of claim 1, further comprising:
   sharing state information between a first external application running on the external device and at least one of the first application or the second application using the unique logical name and the unique global token of the global session, wherein the unique global token is associated with the unique logical name such that state information of the at least one of the first application and the second application is accessible by the first external application.

3. The method of claim 1, wherein correlating communications with internal devices as part of the global session based on the unique global token of the global session comprises correlating communications of the first application and second application, each of the first application and second application being a converged protocol application, by exchanging the global token of the global session as part of the communications.

4. The method of claim 1, further comprising:
   determining whether the session request message is an initial session request message; and generating a local session in response to determining that the session request message is an initial session request message.

5. The method of claim 4, further comprising:
determining whether a global session exists for the session request message, wherein generating the global session is performed only if a global session does not already exist for the session request message.

6. The method of claim 5, further comprising:
incrementing a global session count associated with the global session in response to determining that the global session exists for the session request message and the session request message is an initial session request message;
inserting the global token associated with the global session into the session request message; and
forwarding the session request message to at least one internal device of the internal data network.

7. The method of claim 6, further comprising:
decrementing the global session count associated with the global session in response to tearing down of a local session associated with the global session; and
reclaiming resources of the global session in response to the global session count becoming zero by way of the decrementing.

8. The method of claim 1, further comprising:
receiving a message from the external device, wherein the message is communicated to the data processing system using a logical name of a global session;
identifying the global session associated with the message based on the logical name;
identifying a global session global token associated with the identified global session;
inserting the global session global token into the received message to generate a modified message; and
sending the modified message to at least one internal device of the internal data network.

9. The method of claim 1, further comprising:
receiving a message from an internal device, wherein the message includes the global token of the global session;
removing the global token from the received message to generate a modified message; and
sending the modified message to the external device.

10. The method of claim 1, wherein the unique logical name is one of a Directory Name Service (DNS) hostname, a virtual host name, an address, or a Uniform Resource Identifier (URI).

11. The method of claim 1, wherein the global session is one of a plurality of global sessions in the data processing system, and wherein each global session in the plurality of global sessions has a different unique logical name and a different unique global token.

12. The method of claim 1, wherein the first application and second application are part of a same converged protocol application running on one or more of the internal devices.

13. The method of claim 1, wherein the first local session data structure is stored on a first internal device, of the internal devices, that runs the first application, and wherein the second local session data structure is stored on a second internal device, different from the first internal device, that runs the second application.

14. A computer program product comprising a computer useable medium having a computer readable program, wherein the computer readable program, when executed on a computing device, causes the computing device to:

receive, from an external device of an external data network, a session request message using a first communication protocol;
generate a global session in response to receiving the session request message, the global session having a unique logical name and a unique global token associated with the global session;
correlate communications with the external device as part of the global session based on the unique logical name of the global session; and
correlate communications with internal devices of an internal data network of the data processing system as part of the global session based on the unique global token of the global session, wherein:
the global session comprises a least two local sessions with at least one application running on at least one of the internal devices,
communications with a first application of the one or more applications are performed in a first local session using either the first communication protocol or a second communication protocol different from the first communication protocol,
the first local session has an associated first local session data structure for maintaining session state information for the first local session,
communications with a second application of the one or more applications are performed in a second local session using either the second communication protocol or a third communication protocol different from the second communication protocol,
the second local session has an associated second local session data structure for maintaining session state information for the second local session, and
session state information in the first local session data structure is correlated with session state information in the second local session data structure using the unique global token.

15. The computer program product of claim 14, wherein the computer readable program further causes the computing device to:
share state information between a first external application running on the external device and at least one of the first application or the second application using the unique logical name and the unique global token of the global session, wherein the unique global token is associated with the unique logical name such that state information of the at least one of the first application and the second application is accessible by the first external application.

16. The computer program product of claim 14, wherein the computer readable program further causes the computing device to:
share state information between applications running on internal devices of the internal data network using the global session token.

17. The computer program product of claim 14, wherein the computer readable program causes the computing device to correlate communications with internal devices as part of the global session based on the unique global token of the global session by correlating communications of the first application and second application, each of the first application and second application being a converged protocol application, by exchanging the global token of the global session as part of the communications.

18. The computer program product of claim 14, wherein the computer readable program further causes the computing device to:

determine whether the session request message is an initial session request message; and generate a local session in response to determining that the session request message is an initial session request message.

19. The computer program product of claim 18, wherein the computer readable program further causes the computing device to:

determine whether a global session exists for the session request message, wherein the global session is generated only if a global session does not already exist for the session request message.

20. The computer program product of claim 19, wherein the computer readable program further causes the computing device to:

increment a global session count associated with the global session in response to determining that the global session exists for the session request message and the session request message is an initial session request message;

insert the global token associated with the global session into the session request message; and forward the session request message to at least one internal device of the internal data network.

21. The computer program product of claim 20, wherein the computer readable program further causes the computing device to:

decrement the global session count associated with the global session in response to tearing down of a local session associated with the global session; and reclaim resources of the global session in response to the global session count becoming zero by way of the decrementing.

22. The computer program product of claim 14, wherein the computer readable program further causes the computing device to:

receive a message from the external device, wherein the message is communicated to the data processing system using a logical name of a global session;

identify the global session associated with the message based on the logical name;

identify a global session global token associated with the identified global session;

insert the global session global token into the received message to generate a modified message; and send the modified message to at least one internal device of the internal data network.

23. The computer program product of claim 14, wherein the computer readable program further causes the computing device to:

receive a message from an internal device, wherein the message includes the global token of the global session;

remove the global token from the received message to thereby generate a modified message; and send the modified message to the external device.

24. The computer program product of claim 14, wherein the unique logical name is one of a Directory Name Service (DNS) hostname, a virtual host name, an address, or a Uniform Resource Identifier (URI).

25. The computer program product of claim 14, wherein the global session is one of a plurality of global sessions in the data processing system, and wherein each global session in the plurality of global sessions has a different unique logical name and a different unique global token.

26. The computer program product of claim 14, wherein the first application and second application are part of a same converged protocol application running on one or more of the internal devices.

27. A data processing system, comprising:

a proxy device; and at least one internal data processing device coupled to the proxy device via an internal data network, wherein the proxy device:

receives, from an external device of an external data network, a session request message using a first communication protocol; and generates a global session in response to receiving the session request message, the global session having a unique logical name and a unique global token associated with the global session, and wherein:

communications with the external device are correlated with the global session based on the unique logical name of the global session, and communications with the at least one internal data processing device are correlated with the global session based on the unique global token of the global session, wherein:

the global session comprises a least two local sessions with at least one application running on at least one of the at least one internal data processing device, communications with a first application of the one or more applications are performed in a first local session using either the first communication protocol or a second communication protocol different from the first communication protocol, the first local session has an associated first local session data structure for maintaining session state information for the first local session, communications with a second application of the one or more applications are performed in a second local session using either the second communication protocol or a third communication protocol different from the second communication protocol, the second local session has an associated second local session data structure for maintaining session state information for the second local session, and session state information in the first local session data structure is correlated with session state information in the second local session data structure using the unique global token.

28. The system of claim 27, wherein state information is shared between a first external application running on the external device and at least one of the first application or the second application using the unique logical name and the unique global token of the global session, wherein the unique global token is associated with the unique logical name such that state information of the at least one of the first application and the second application is accessible by the first external application.

29. The system of claim 27, wherein state information is shared between applications running on the at least one internal data processing device using the global session token.

30. The system of claim 27, wherein communications with the at least one internal data processing device are correlated with the global session based on the unique global token of the global session by correlating communications of the first application and second application, each of the first application and second application being a converged protocol application, by exchanging the global token of the global session as part of the communications.

31. The system of claim 27, wherein the proxy device:

determines whether the session request message is an initial session request message;

generates a local session in response to determining that the session request message is an initial session request message; and determines whether a global session exists for the session request message, wherein generating the global session is performed only if a global session does not already exist for the session request message.

32. The system of claim 31, wherein the proxy device:

increments a global session count associated with the global session in response to determining that the global session exists for the session request message and the session request message is an initial session request message;

inserts the global token associated with the global session into the session request message;

forwards the session request message to at least one internal device of the internal data network;

decrements the global session count associated with the global session in response to tearing down of a local session associated with the global session; and reclaims resources of the global session in response to the global session count becoming zero by way of the decrementing.

33. The system of claim 27, wherein the proxy device:

receives a message from the external device, wherein the message is communicated to the data processing system using a logical name of a global session;

identifies the global session associated with the message based on the logical name;

identifies a global session global token associated with the identified global session;

inserts the global session global token into the received message to generate a modified message; and sends the modified message to at least one internal device of the internal data network.

34. The system of claim 27, wherein the proxy device:

receives a message from an internal device, wherein the message includes the global token of the global session;

removes the global token from the received message to generate a modified message; and sends the modified message to the external device.

35. The system of claim 27, wherein the first application and second application are part of a same converged protocol application running on one or more of the internal devices.

* * * * *